United States Patent
Ganachaud et al.

(10) Patent No.: US 10,723,845 B2
(45) Date of Patent: Jul. 28, 2020

(54) PROCESS FOR PREPARING LINEAR CARBOSILOXANE POLYMERS

(71) Applicant: DOW CORNING CORPORATION, Midland, MI (US)

(72) Inventors: Francois Ganachaud, Decines (FR); Frederic Gubbels, Houtain-le-Val (BE); Cedric Pasquet, Reims (FR)

(73) Assignee: Dow Silicones Corporation, Midland, MI (US)

( * ) Notice: Subject to any disclaimer, the term of this patent is extended or adjusted under 35 U.S.C. 154(b) by 220 days.

(21) Appl. No.: 15/746,923

(22) PCT Filed: Aug. 3, 2016

(86) PCT No.: PCT/US2016/045230
§ 371 (c)(1),
(2) Date: Jan. 23, 2018

(87) PCT Pub. No.: WO2017/062091
PCT Pub. Date: Apr. 13, 2017

(65) Prior Publication Data
US 2020/0079911 A1  Mar. 12, 2020

(30) Foreign Application Priority Data
Oct. 9, 2015  (EP) .................... 15290258

(51) Int. Cl.
*C08G 77/48* (2006.01)

(52) U.S. Cl.
CPC ................... *C08G 77/485* (2013.01)

(58) Field of Classification Search
CPC .................... C07F 7/0836; C08G 77/16
See application file for complete search history.

(56) References Cited

U.S. PATENT DOCUMENTS

| 5,386,049 | A | 1/1995 | Kishita et al. |
| 6,080,829 | A | 6/2000 | Tapsak et al. |
| 6,492,480 | B1 | 12/2002 | Nagashima et al. |
| 8,586,690 | B2 | 11/2013 | Gubbels et al. |

FOREIGN PATENT DOCUMENTS

JP  2001278990  10/2001

OTHER PUBLICATIONS

Interrante (Polymer Preprints, 2001 42(1) 225-226).*
Benouargha, et al. "Hybrid Silalkylene Polysiloxanes: Synthesis and Thermal Properties", Eur. Polym. J., vol. 33 (1997), pp. 1117-1124.
Interrante, et al. "Poly(dimethylsilylenemethylene-co-dimethylsiloxane): A Regularly Alternating Copolymer of Poly(dimethylsiloxane) and Poly(dimethylsilylenemethylene)", Macromolecules, vol. 34 (2001), pp. 1545-1547.
Tapsak, et. al. "Preparation of Cyclosilalkylenesiloxane Monomers and Their Cationic ROP", J. Inorg. and Organometallic Polymers, vol. 9, No. 1, 1999, pp. 35-53.

* cited by examiner

*Primary Examiner* — Kuo Liang Peng

(57) ABSTRACT

The present invention relates to a process for preparing a linear carbosiloxane polymer, which comprises subjecting at least one thoroughly purified cyclic carbosiloxane monomer to ring opening polymerization in the presence of an acidic or basic catalyst and at least one silanol-functional compound.

20 Claims, No Drawings

PROCESS FOR PREPARING LINEAR CARBOSILOXANE POLYMERS

CROSS-REFERENCE TO RELATED APPLICATIONS

This application is a national stage filing under 35 U.S.C. § 371 of PCT Application No. PCT/US16/045230 filed Aug. 3, 2016, currently pending, which claims the benefit of European Priority Patent Application No. 15290258.1 filed Oct. 9, 2015. PCT Application No. PCT/US16/045230 and European Priority Patent Application No. 15290258.1 are hereby incorporated by reference.

TECHNICAL FIELD

The present invention relates to a novel process for preparing linear carbosiloxane polymers.

BACKGROUND

Polyorganosiloxanes, i.e. polymers having a backbone consisting of alternating silicon and oxygen atoms and pendant organic groups attached to the silicon atoms of the backbone, are well-known and appreciated for their unique combination of properties including low glass transition temperatures, low surface tension, weathering resistance, and biocompatibility. These materials exhibit generally remarkable chemical and thermal stabilities, however, the polar nature of the siloxane bond and the high flexibility of the polymer backbone render them prone to degradation by ionic substances such as acids or bases, in particular at high temperatures. Carbosiloxane polymers, sometimes also referred to as hybrid silicones, i.e. polymers having a backbone comprising besides oxygen atoms also organic moieties such as alkylene, arylene or fluoroalkylene groups as groups bridging adjacent Si atoms, are less susceptible to molecular chain scission by ionic substances, which has been attributed to the less polar nature of the Si—C bond and a stiffening of the backbone by implementation of the organic groups preventing spatial reorganization to a cyclic transition state associated with degradation mechanisms. Thus carbosiloxane polymers such as polysilalkylenesiloxanes represent an attractive alternative to polyorganosiloxane materials in applications where thermal and chemical stability under demanding conditions is required.

A variety of different processes for the production of linear carbosiloxane polymers has been developed in the past. In particular polysilalkylenesiloxanes have been prepared by three principal synthetic routes, namely A) by polycondensation of bis-silanol terminated silalkylene precursors, B) by hydrosilylation polymerization of an α,ω-diene and an α,ω-dihydrodisiloxane, and C) by ring opening polymerization of cyclic silalkylenesiloxane monomers. Step growth condensation polymerization of bis-silanol terminated silalkylene compounds yields polysilalkylenesiloxanes of merely moderate molecular weight ($M_n$ of less than 50,000 g/mol), see for example U.S. Pat. No. 5,386,049 and A. Benouargha et al., Eur. Polym. J., 33 (1997), 1117-1124. The obtained product has silanol end groups. A terminal functionalization of the product such as for example by introducing vinyl-functional end groups requires an additional synthetic step.

Also the polymerization by means of hydrosilylation step growth has several inherent disadvantages: Due to the nature of the reactants the organic bridging groups in the resulting carbosiloxane polymer necessarily have at least two carbon atoms. Thus in particular polysilmethylenesiloxanes cannot be synthesized by the hydrosilylation route. Moreover, the reaction is very sensitive to the stoichiometric balance of the reactants. Side reactions which cause deviations from this balance limit the obtainable degree of polymerization. For instance, transition metal catalysts typically used for hydrosilylation reactions can isomerize a terminal carbon-carbon double bond to an internal position, thereby converting the α,ω-diene into a monofunctional species. Consequently typically only polysilalkylenesiloxanes of low molecular masses ($M_n$<30,000 g/mol) are obtainable by the hydrosilylation route.

Despite of the limitations with regards to the obtainable degree of polymerization, the hydrosilylation technique has been found valuable in the preparation of cyclic monomers that can be used to synthesize polysilalkylenesiloxanes by ring opening polymerization. Thus Tapsak et al., Journal of Inorganic and Organometallic Polymers, 9 (1) (1999), 35-53 describe the preparation of cyclosilalkylenesiloxane monomers containing alkylene units having from 6 to 14 carbon atoms by synthesizing in a first step polysilalkylenesiloxanes of relatively low molecular weight by hydrosilylation from 1,1,3,3-tetramethyldisiloxane and 1,5-hexadiene, 1,7-octadiene, 1,9-decadiene or 1,13-tetradecadiene, respectively. These polymers were then subjected to depolymerization in presence of KOH at high temperature (200° C.) to obtain a mixture of cyclic monomers, separated by means of vacuum distillation. The cyclic silalkylenesiloxane monomers were finally purified by recrystallization or vacuum distillation and subsequently subjected to ring opening polymerization using an acidic catalyst (Dowex 50 W ion exchange resin) to obtain polysilalkylene-siloxanes of significantly higher molecular mass ($M_n$ up to 346,000 g/mol) than achievable by the hydrosilylation route. This reference thus provides a process enabling to obtain polysilalkylenesiloxanes having a comparatively high molecular weight ($M_n$>100,000 g/mol), however, no comprehensive control and engineering of the molecular weight was demonstrated. Moreover the ring opening polymerization according to this process requires quite stringent reaction conditions involving reaction temperatures of about 140° C. Polysilalkylene-siloxanes comprising methylene bridging units cannot be obtained with this method since the unsaturated precursor used in the hydrosilylation step necessarily contains terminal carbon-carbon double bonds and thereby yields alkylene units having at least two carbon atoms.

U.S. Pat. No. 6,492,480 describes a method for the preparation of a linear polysilalkylenesiloxane by subjecting a four- to seven-membered cyclic silalkylene monomer including also silmethylenesiloxane to ring opening polymerization in a non-aqueous solvent under mild and neutral conditions using a specific type of polynuclear ruthenium-carbonyl complex as catalyst in the presence of a silane compound having at least one Si—H bond as co-catalyst. Typically the equilibrium between the desired high molecular linear polysilalkylenesiloxane, linear and cyclic oligomers and unused monomer is reached within a reasonable reaction time of a few hours at a reaction temperature in the range from 30 to 50° C. The specific catalyst/co-catalyst system enables a control of the molecular weight of the resulting polymer without use of a chain transfer agent by simple variation of the concentration of the monomer, the catalyst and the silane compound as well as the choice of the solvent. The resulting polymer can have a considerably high degree of polymerization ($M_n$ up to 157,000 g/mol) and generally has a narrow molecular weight distribution with a polydispersity index in the range from 1.3 to 2.6. However, this process requires the use of an expensive complex transition metal catalyst. Additionally, removal of the solvent after the completion of the reaction is necessary. Moreover, while controlled variation of the molecular weight may be possible in a wide range, this process itself provides only very limited means to control the end groups as the resulting polymer usually has a hydrogen atom or, when water is present in the reaction system, a hydroxyl group, at each end. Thus further functionalization would require an additional process step.

Interrante et. al describe the preparation of poly(dimethylsilylenemethylene-co-dimethylsiloxane) by ring opening polymerization of 1,1,3,3,5,5,7,7-octamethyl-2,6-dioxa-1,3,5,7-tetrasilacyclooctane in the presence of triflic acid as catalyst at room temperature (Macromolecules, 34 (2001), 1545-1547). The used monomer was obtained by reacting ClSi(Me)$_2$CH$_2$Si(Me)$_2$Cl in ethyl acetate with zinc oxide and subsequent fractional vacuum distillation. Although the authors demonstrated that polysilmethylenesiloxanes could be obtained by this process with reasonable yield under mild conditions without the need for costly complex catalysts, they were only able to prepare polymers of moderate molecular weight ($M_n$ of about 50,000 g/mol). The process also yielded a significant proportion of undesired macrocyclic molecules. Moreover, no means for a control of the molecular weight of the resulting polymer nor its end groups were provided.

U.S. Pat. No. 8,586,690 proposes a two-step process for the production of high molecular weight linear polysilalkylenesiloxanes. Initially a cyclic silalkylenesiloxane monomer is subjected to a first ring opening polymerization in the presence of a basic or acidic catalyst to form a mixture of siloxane monomers and linear oligomers. The oligomers are then precipitated by addition of a suitable solvent and removed from the mixture. The remaining siloxane monomer mixture is subsequently used as a starting material in a second ring opening polymerization step, which is to be conducted within the melting point range of the monomer mixture. It was shown that polysilalkylenesiloxane of significantly higher molecular weight ($M_n$ above 100,000 g/mol) could be obtained by this two step process compared to direct single step ring opening polymerization of the initial cyclic monomer, however, the reason for this surprising finding remained unclear. Using 1,1,3,3,5,5,7,7-octamethyl-2,6-dioxa-1,3,5,7-tetrasilacyclooctane as starting cyclic monomer it was in particular demonstrated that also polysilmethylene-siloxane polymers could thus be obtained under mild reaction conditions using inexpensive readily available acidic or basic ring opening polymerization catalysts without the above-mentioned limitations to the molecular weight found by Interrante et al. However, the implementation of a second polymerization step increases the complexity of the preparation method. As a further disadvantage in view of process efficiency, a part of the starting material is wasted as the linear oligomers separated after the first ring opening polymerization step are discarded. Moreover, the process according to U.S. Pat. No. 8,586,690 includes no means allowing controlling the molecular weight and/or the end groups of the resulting polymer. Such control would however be helpful as it imparts the ability to engineer the properties of the resulting polymer material such as its rheological characteristics or its cross-linkability according to the requirements of the intended application.

Problem to be Solved

It is therefore an object of the present invention to provide a process for preparing linear carbosiloxane polymers, wherein at least some, ideally all, of the afore-mentioned deficiencies of the processes known from the prior art are alleviated or overcome. Accordingly, the present invention aims in particular to provide an economically attractive, efficient and reliable process that allows producing linear carbosiloxane polymers, including in particular polysilmethylene-siloxanes, with good yields under mild reaction conditions, and enables controlling the average molecular weight of the resulting polymer in a wide range including the ability to obtain polymers of high molecular weight ($M_n$ of 100,000 g/mol or more) as well as controlling the end groups of the polymer.

SUMMARY OF THE INVENTION

The present invention thus provides a process for preparing a linear carbosiloxane polymer, which comprises subjecting at least one cyclic carbosiloxane monomer of the structure

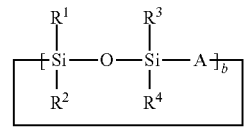

wherein b is an integer in the range from 2 to 6, each A is independently selected from a divalent optionally substituted hydrocarbyl group having from 1 to 20 carbon atoms, and each $R^1$, $R^2$, $R^3$ and $R^4$ is independently selected from a monovalent organic group having from 1 to 18 carbon atoms, to ring opening polymerization in the presence of an acidic or basic catalyst and at least one compound having one or two group(s) selected from free silanol groups and blocked silanol groups, wherein the at least one cyclic carbosiloxane monomer is purified to a degree of purity of at least 99.0 weight percent prior to any ring opening polymerization.

Typically this process according to the present invention comprises the steps of:
a) Providing a carbosiloxane monomer raw material comprising at least one cyclic carbosiloxane monomer of the afore-mentioned structure;
b) Purifying the carbosiloxane monomer raw material such that the purified material comprises at least 99.0 weight percent of the at least one cyclic carbosiloxane monomer, based on the total weight of the carbosiloxane monomer material;
c) Combining the purified carbosiloxane monomer material with a predetermined amount of at least one compound having one or two group(s) selected from free silanol groups and blocked silanol groups to form a reaction mixture; and
d) Subjecting the reaction mixture to ring opening polymerization in the presence of an acidic or basic catalyst.

The inventors have found out that it is important to thoroughly purify the starting monomer(s) prior to the ring opening polymerization in order to achieve reproducible polymerization results and to be able to obtain linear high molecular weight carbosiloxane polymers. Experimental studies conducted in the course of the present invention indicate that the inability to obtain carbosiloxane polymers, in particular polysilmethylenesiloxanes, of high molecular weight by a single step ring opening polymerization process and/or to control the degree of polymerization in a reproducible manner as encountered in the prior art originate from an insufficient degree of purity of the monomer(s) achievable by the used purification methods such as single stage vacuum distillation and/or from ageing of the purified monomer(s) upon storage. The inventors have further surprisingly found out that compounds having one or two groups selected from free silanol groups and blocked silanol groups (also referred to collectively herein as "silanol-functional compounds"), when used in combination with an acidic or basic catalyst, can efficiently promote the ring opening polymerization of cyclic silalkylenesiloxane monomers. The average molecular weight of the resulting polymer may thus systematically be adjusted in a wide range and a well controlled manner, if the starting monomer(s) have been sufficiently purified, by regulating the amount of such silanol-functional compound used in proportion to the amount of monomer. The selection of the specific kind of silanol-functional compound allows at the same time a certain control of the end groups of the resulting polymer. The process according to the present invention thus allows to obtain linear carbosiloxane polymers including polysilmethylenesiloxanes of a targeted average molecular weight and with controlled end groups by a single step ring opening polymerization process under mild conditions, e.g. at a reaction temperature in the range of 10 to 50° C. such as at room temperature, with adequate yields in comparatively short reaction times without having to use complex transition metal catalysts.

DETAILED DESCRIPTION OF THE INVENTION

The process according to the present invention will be described in more detail in the following. As pointed out above, the at least one cyclic carbosiloxane monomer used in the process according to the present invention has a structure according to the formula:

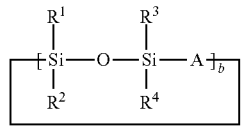

Herein each A is independently selected from a divalent optionally substituted hydrocarbyl group having from 1 to 20, preferably from 1 to 12 or from 1 to 5, carbon atoms. The groups A may be the same or different from one another. The divalent hydrocarbyl group can be linear or branched, cyclic or acyclic, saturated or unsaturated, as well as aliphatic or aromatic. Suitable hydrocarbyl groups can be exemplified by an alkylene group, an alkenylene group, a cycloalkylene group, an alkynylene group, an arylene group, an arylalkylene group and an alkylarylene group. Typically the divalent hydrocarbyl group is an alkylene group, preferably a linear alkylene group having from 1 to 5, more preferably from 1 to 3, carbon atoms such as a methylene group, an ethylene group or a propylene group. In a particularly preferred embodiment A is a methylene group.

Optional substitution of the divalent hydrocarbyl group means herein that one or more of the hydrogen atoms of the divalent hydrocarbyl group, which can for example be any hydrocarbyl group mentioned above, may be replaced by a functional group. The term functional group relates to a covalently bound moiety comprising at least one heteroatom, i.e. an atom different from carbon and hydrogen.

Non-limiting examples of suitable functional groups include halogen atoms such as chlorine, bromine, fluorine and iodine, oxygen containing groups such as carboxyl, carbonyl, keto, (meth)acryl, hydroxyl, ether and polyether groups, nitrogen containing groups such as amine, amide and cyano groups, and sulphur containing groups such as mercapto and thioether groups.

Each of $R^1$, $R^2$, $R^3$ and $R^4$ in the cyclic carbosiloxane monomer is independently selected from a monovalent organic group having from 1 to 18, preferably from 1 to 12, carbon atoms. Typically the monovalent organic group is selected from an alkyl group, alkenyl group, alkinyl group, aryl group, aralkyl group, alicyclic group or heterocyclic group, wherein each of these groups may optionally be substituted by one or more functional group(s). Suitable alkyl and alicyclic groups comprise for instance methyl, ethyl, isopropyl, n-propyl, n-butyl, sec-butyl, tert-butyl, amyl, cyclohexyl, heptyl, 2-ethylhexyl, dodecyl, hexadecyl and octadecyl. Suitable alkenyl groups include for example vinyl, allyl and butenyl. Suitable aryl and aralkyl groups can be exemplified by phenyl, tolyl, xylyl, benzyl and the like. Suitable heterocyclic groups can be for example pyridinyl, furanyl and the like. Functional groups, which may optionally be present in the monovalent organic group such as any one of the exemplary monovalent organic group mentioned above, can for instance be selected from the group of halogen such as chlorine, fluorine, bromine or iodine, carboxyl, carbonyl, keto, amino, amido, ether, hydroxy, cyano and mercapto, whereof halogen atoms are preferred. Preferred monovalent organic groups are unsubstituted or halogenated alkyl groups having from 1 to 8, in particular from 1 to 4, carbon atoms such as methyl, ethyl, n-propyl, iso-propyl, n-butyl, sec-butyl or tert-butyl and halogenated derivatives thereof such as chloromethyl, perfluorobutyl, trifluoropropyl or trifluoroethyl. In a preferred embodiment each monovalent organic group $R^1$, $R^2$, $R^3$ and $R^4$ is selected from an alkyl or fluoroalkyl group, most typically being a methyl or ethyl group.

The cyclic carbosiloxane monomer useful in the present invention can comprise two or more than two, namely up to six, constituting carbosiloxane units —[Si($R^1$)($R^2$)—O—Si($R^3$)($R^4$)-A]-, which can be the same or different from one another. The corresponding value of the structural parameter b is thus an integer in the range from 2 to 6. Preferably b has a value of 2, 3 or 4. The use of cyclic dimers (i.e. compounds wherein b is 2) is particularly preferred.

Typically the at least one cyclic carbosiloxane monomer used in the process according to the present invention is a cyclic silalkylenesiloxane, in particular a cyclic silalkylenesiloxane wherein each A is a linear alkylene group having from 1 to 5 carbon atoms such as a methylene or ethylene group, $R^1$, $R^2$, $R^3$ and $R^4$ are alkyl or fluoroalkyl groups having from 1 to 4 carbon atoms such as methyl or ethyl groups, and b is an integer in the range from 2 to 4, preferably being 2. A suitable specific example of such cyclic carbosiloxane monomer is 1,1,3,3,5,5,7,7-octamethyl-2,6-dioxa-1,3,5,7-tetrasilacyclooctane.

Cyclic carbosiloxane monomers useful in the process according to the present invention as described above can be obtained by any suitable preparation method known in the art. For instance such cyclic carbosiloxane monomers can be synthesized from a dichlorocarbosilane of the structure

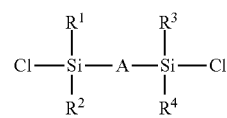

wherein R¹, R², R³, R⁴ and A are each as defined above and can be selected according to the specific targeted cyclic carbosiloxane monomer, by either reacting the dichlorocarbosilane compound with zinc oxide in an organic solvent such as ethyl acetate as described e.g. in U.S. Pat. No. 8,586,690 or by subjecting the dichlorocarbosilane compound to hydrolysis. The dichloro-carbosilane precursor may be obtained e.g. by alkyl-halide exchange reaction of a corresponding carbosilane, i.e. a compound having alkyl groups instead of chlorine atoms bound to both silicon atoms, with trimethylchlorosilane under the effect of aluminum chloride or by Grignard reaction of a compound X-A-X, wherein X is a halogen atom such as chlorine and A is a divalent optionally substituted hydrocarbyl group as defined above, with a molar excess of dihalogenoorganosilane X—Si(R¹)(R²)—X and/or X—Si(R³)(R⁴)—X. Alternatively cyclic carbosiloxane monomers useful as starting materials in the process according to the present invention can also be obtained by the method described by Tapsak et al. in Journal of Inorganic and Organometallic Polymers, 9 (1) (1999), 35-53, i.e. step growth polymerization of an α,ω-diene and an α,ω-dihydrodisiloxane, which may be selected in accordance with the specific targeted cyclic monomer, by hydrosilylation and subsequent depolymerization of the resulting oligomers under the effect of vigourous heating in the presence of a strong base. Generally these preparation methods yield a mixture of cyclic carbosiloxane compounds of different ring sizes and linear oligomers. Specific cyclic carbosiloxane monomers can be isolated from such mixture using different conventional methods such as fractional distillation and/or precipitation in appropriate organic solvents as described also in the afore-mentioned reference.

Typically a single type of cyclic carbosiloxane monomer is employed in the process according to the present invention, however, also a mixture of two or more different cyclic carbosiloxane monomers can be used therein.

In any case, the degree of purity of the at least one cyclic carbosiloxane monomer used in the ring opening polymerization has been found to be important for controlling the process in a reproducible manner and to be able to achieve high degrees of polymerization as pointed out above. Accordingly, the at least one cyclic carbosiloxane monomer is generally purified to a degree of purity of at least 99.0 weight percent prior to any ring opening polymerization in the process according to the present invention. Preferably the degree of purity of the at least one cyclic carbosiloxane monomer used as starting material in the ring opening polymerization is at least 99.5 weight percent, more preferably at least 99.8 weight percent or at least 99.9 weight percent. In the context of the present invention, weight percentages defined as a measure of the degree of purity are based on the total mass of the material used as a source of the respective monomer(s) such as the carbosiloxane monomer material mentioned above or the siloxane monomer material mentioned further below. In other words, the material used as a source of the respective monomer(s) comprises the specified monomer(s) at least in a total amount, which corresponds to a weight fraction of the percentage value indicated as degree of purity of the respective monomer(s), based on the total weight of the material. Accordingly, for instance the carbosiloxane monomer material used as a source of the above-defined cyclic carbosiloxane monomer(s) in the ring opening polymerization process generally comprises in total at least 99.0 weight percent of the one or more cyclic carbosiloxane monomer(s) of the above-mentioned structure.

Any purification methods known in the art can in principle be applied, provided they are suitable to achieve the afore-mentioned required minimum degree of purity. For example repeated fractional vacuum distillation involving two or more vacuum distillation steps has been found to yield cyclic carbosiloxane monomers typically in such degree of purity. The linear oligomers may moreover be efficiently removed by precipitation in a polar organic solvent such as methanol. On the contrary, purification by single stage vacuum distillation as frequently applied in the prior art is usually not able to attain the afore-mentioned purity grades of the cyclic carbosiloxane monomer. Tapsak et al., Journal of Inorganic and Organometallic Polymers, 9 (1) (1999), 35-53 report for instance a value of merely 98.5% for the degree of purity of cyclic carbosiloxane monomers that have been purified by single stage vacuum distillation. However, below the above-indicated minimum degree of purity of the starting material the process may not be controlled as reliable as according to the process of the present invention causing a lack of reproducibility and variations of the characteristics of the product and preventing typically the ability to achieve carbosiloxane polymers of high molecular weight due to uncontrolled effects of impurities such as linear oligomeric carbosiloxanes. As the cyclic carbosiloxane monomers of the above-mentioned type have further been found to have a tendency towards degradation upon storage it is recommended to purify the at least one cyclic carbosiloxane monomer directly before its use in the ring opening polymerization according to the process of the present invention.

Optionally, one or more than one cyclic siloxane monomer can be used in addition to the at least one cyclic carbosiloxane monomer described above in the ring opening polymerization of the process according to the present invention. Herein the term "cyclic siloxane monomer" relates to any compound comprising a cyclic structure of covalently bound alternating silicon and oxygen atoms and pendant organic groups bound to the silicon atoms. The cyclic siloxane monomer can for example have a structure according to the following formula:

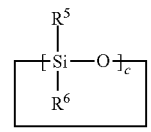

wherein c is an integer of at least 3 and each of $R^5$ and $R^6$ is independently selected from a monovalent organic group as defined above for $R^1$, $R^2$, $R^3$ and $R^4$, wherein the constituting siloxane units —[Si(R⁵)(R⁶)—O]— can be the same or different from one another.

Typically each monovalent organic group $R^5$ and $R^6$ is independently selected from the group of a linear or branched alkyl group having from 1 to 4 carbon atoms such as methyl, ethyl, iso-propyl, n-propyl, n-butyl and tert-butyl, whereof ethyl and methyl are preferred, an aryl or aralkyl group having from 6 to 12 carbon atoms such as phenyl, and an alkenyl group having from 2 to 8 carbon atoms such as vinyl. The parameter c is moreover typically in the range from 3 to 20 such as from 3 to 8. Preferably c is 3, 4, 5 or 6. Suitable cyclic siloxane monomers that can be utilized in the process according to the present invention thus include for example hexamethylcyclotrisiloxane ($D_3$), octamethyl-cyclo-tetrasiloxane ($D_4$), decamethylcyclopentasiloxane ($D_5$), dodecamethylcyclo-hexasiloxane ($D_6$), hexaethylcyclotrisiloxane, octaethylcyclotetrasiloxane and the like. Such cyclic siloxane compounds are commercially available and can be produced e.g. by hydrolysis of the respective dialkyldichlorosilanes and subsequent separation from simultaneously formed linear polymers.

If a cyclic siloxane monomer is used besides the at least one cyclic carbosiloxane monomer in the process according to the present invention it is preferably employed in a degree of purity of at least 99.0 weight percent, more preferably at least 99.5 weight percent or at least 99.8 weight percent or at least 99.9 weight percent. If required, the cyclic siloxane monomer can be purified by any suitable purification methods such as those mentioned above to such degree of purity prior to the ring opening polymerization. Use of a cyclic siloxane monomer in the process according to the present invention can accordingly include the additional steps of providing a siloxane monomer raw material comprising at least one cyclic carbosiloxane monomer, purifying the siloxane monomer raw material such that the purified material comprises at least e.g. 99.0 weight percent of the at least one cyclic siloxane monomer, based on the total weight of the siloxane monomer material and combining the purified siloxane monomer material with the purified carbosiloxane material and the at least one silanol-functional compound to form the reaction mixture for the ring opening polymerization in the presence of an acidic or base catalyst.

The use of one or more cyclic siloxane monomer in addition to the at least one cyclic carbosiloxane monomer enables to obtain linear carbosiloxane copolymers with adjustable proportion of carbosiloxy repeating units to siloxy repeating units and allows thereby to engineer the material properties of the obtained polymer such as the glass transition temperature according to the requirements of the intended application. The relative amounts in which cyclic carbosiloxane monomers and cyclic siloxane monomers can be employed in the process according to the present invention is not particularly limited and can be selected in accordance with the targeted material properties. Nevertheless the molar ratio of cyclic carbosiloxane monomers to cyclic siloxane monomers, if any, used as starting material for the ring opening polymerization in the process according to the present invention is typically in a range from 1,000:1 to 1:1,000 such as from 100:1 to 1:100 or from 20:1 to 1:20. Preferably the molar ratio of cyclic carbosiloxane monomers to cyclic siloxane monomers used as starting material is in the range from 20:1 to 1:5, more preferably from 10:1 to 1:2.

According to the process of the present invention the ring opening polymerization of the afore-described at least one cyclic carbosiloxane monomer and optionally one or more than one cyclic siloxane monomer, hereinafter collectively referred to as cyclic monomer(s), is conducted in the presence of an acidic or basic catalyst. Any acidic or basic substance can be employed, provided that it catalyzes the ring opening polymerization of the cyclic monomer(s). The catalyst can for example be a protonic acid or a Lewis acid. Suitable Lewis acids are e.g. halides (e.g. chlorides, bromides, or fluorides) of B, P, Al, Sb, As, Fe, Ti or Sn. Exemplary Lewis acids that can be used as catalyst in the process according to the present invention include for instance $BF_3$, $BF_3.Et_2O$, $BF_3THF$, $AlCl_3$, $BCl_3$, $AlBr_3$, $AlEt_2Cl$, $AlEtCl_2$, $Al(O\text{-}iPr)_3$, $FeBr_3$, $FeCl_3$, $TiCl_4$, $SnCl_4$, $Ti(O\text{-}iPr)_4$, $I_2$, $PF_5$, $PCl_5$, $PCl_3$, $OPCl_3$ and $SbCl_5$. As protonic acids, organic acids and/or inorganic acids can be employed. Suitable organic protonic acids are for example formic acid, acetic acid, propionic acid, valeric acid, glycolic acid, butyric acid, caproic acid, caprylic acid, capric acid, benzoic acid, octanoic acid, p-toluenesulfonic acid, trifluoroacetic acid, lauric acid, citric acid, myristic acid, undecylenic acid, stearic acid, palmitic acid, oleic acid, acrylic acids, polyacrylic acids, polymethacrylic acids, other carboxyl-functional polymers and acidic ion exchange resins, super acids such as fluorosulfuric acid or perfluoroalkane sulfonic acids such as trifluoromethane sulfonic acid (triflic acid), perfluoro-ethanesulfonic acid, perfluoropropanesulfonic acid, perfluorobutanesulfonic acid, perfluoropentane-sulfonic acid, perfluorohexanesulfonic acid, perfluoroheptane-sulfonic acid, perfluorooctanesulfonic acid, perfluorodecanesulfonic acid, tetrafluoro-2-(pentafluoroethoxy)ethanesulfonic acid and sulfonated perfluorinated (co) polymers such as e.g. commercially available under the tradename Nafion®. Suitable inorganic acids include for example hydrochloric acid, HBr, HI, perchloric acid, sulfuric acid, nitric acid, phosphoric acid and heteropoly acids. A single type of acid or a mixture of a plurality of acids, e.g. selected from those mentioned above, can be used as acidic catalyst in the process according to the present invention. Suitable basic catalysts that can be used in the process according to the present invention comprise without being limited thereto e.g. metal hydroxides such as sodium hydroxide, potassium hydroxide or calcium hydroxide, metal alkoxides and silanolates such as sodium ethoxide, sodium silanolate, lithium silanolate and potassium silanolate, ammonia and amines such as e.g. triethylamine. Other suitable basic catalysts are mentioned e.g. in U.S. Pat. No. 8,586,690, which is incorporated herein by reference in its entirety. A single type of base or a mixture of a plurality of bases, e.g. selected from those mentioned above, can be used as basic catalyst in the process according to the present invention. Preferably the catalyst used in the process according to the present invention is an acidic catalyst though. More preferably the catalyst is a protonic acid selected from the group of formic acid, acetic acid, a perfluoroalkane sulfonic acid such as triflic acid, sulfuric acid, perchloric acid, nitric acid, hydrochloric acid, phosphoric acid, para-toluenesulfonic acid and trifluoroacetic acid. A particularly suitable catalyst for the process according to the present invention is triflic acid.

The catalyst is generally used in an amount that is catalytically effective, i.e. is sufficient to noticeably accelerate the ring opening polymerization reaction and allows reaching the equilibrium within reasonable reaction time. As the skilled artisan is aware of, suitable amounts depend on the specific catalyst selected as well as the nature of the other components in the reaction mixture and the reaction conditions such as reaction temperature. In case of doubt a suitable amount of catalyst may be determined in a straightforward manner by variation of the used amount and tracking of the temporal progress of monomer conversion by suitable in-situ analytics or by analyzing samples taken from the reaction mixture at different times after the start of the reaction. Typically the catalyst is used in an amount corresponding to a concentration in the range from 0.001 to 0.05 mol. %, preferably 0.005 to 0.02 mol. %, based on the total amount of cyclic monomers.

Besides the catalyst at least one compound having one or two group(s) selected from free silanol groups and blocked silanol groups, is present in the ring opening polymerization according to the present invention. Such compounds can be capable of co-reacting in the ring opening polymerization to modulate the molar mass of ultimate linear polymeric carbosiloxane molecules. In contrast to a catalyst such compounds can be consumed in the reaction, i.e. form part of the resulting polymer molecules. It has surprisingly been found by the inventors of the present invention that compounds having one or two group(s) selected from free silanol groups and blocked silanol groups are able to efficiently participate in the ring opening polymerization reaction of cyclic carbosiloxane monomers as described above in the presence of an acidic or basic catalyst.

In the context of the present invention it is collectively referred to such compounds having one or two group(s) selected from free silanol groups and blocked silanol groups for the use in the ring opening polymerization of the cyclic monomers as "silanol-functional compounds", irrespective of whether one or, if applicable, both silanol groups are blocked or free (i.e. actually correspond to a silanol moiety Si—OH in the usual sense). In the context of the present invention a blocked silanol group refers to a Si—O-containing group that is capable of forming a silanol moiety Si—OH by hydrolysis under the conditions of the ring opening polymerization according to the present invention. The blocked silanol group can have a structure of the type Si—O-Q, wherein Q is a blocking moiety that is removable by hydrolytic cleavage of the O-Q bond. The blocking moiety can e.g. be an optionally substituted alkyl group or a moiety obtained from an oxoacid (e.g. a carboxylic acid) by formal abstraction of a hydrogen atom. Accordingly, the blocked silanol group can e.g. be an esterified silanol group or an alkoxylated silanol group.

Without intending to be bound by any theory the inventors believe that the oxygen atom of the silanol group(s) of the silanol-functional compound(s), possibly only after hydrolysis by traces of water in the reaction mixture, if the silanol group was initially blocked, is able to cause a nucleophilic attack on Si atoms in cyclic monomers activated by the catalyst, e.g. Si atoms in the α-position of silyl oxonium ions formed by protonation of the cyclic monomers by an acidic catalyst to form under ring opening a linear intermediate adduct. This linear intermediate adduct comprises at least one terminal silanol group, which is considered to enable analogous stepwise addition of further monomers to form a polymeric chain. The silanol-functional compound used in the process according to the present invention can e.g. be a mono- or difunctional silyl ester, mono- or difunctional silanol or a silanol-functional silyl ester. If the compound comprises two silanol groups, which can each and independently be free or blocked, i.e. is difunctional, these groups can involve a single Si atom or two distinct Si atoms. Suitable silanol-functional compounds can thus e.g. have a structure according to the formula:

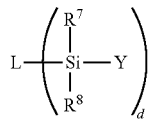

wherein the parameter d is 1 or 2, each Y is independently selected from a hydroxyl group and a moiety obtained from an oxoacid (e.g. a carboxylic acid) by formal abstraction of a hydrogen atom, each $R^7$ and $R^8$ is independently selected from a monovalent organic group having from 1 to 30 carbon atoms and L is selected, if d is 1, from a monovalent organic group as defined above for $R^7$ and $R^8$ and a group as defined for Y, or is selected, if d is 2, from a divalent organic group having from 1 to 30 carbon atoms, oxygen —O—, a siloxy moiety —[Si($R^9$)($R^{10}$)O]$_e$— and a carbosiloxy moiety —[Si($R^{11}$)($R^{12}$)-E-Si($R^{13}$)($R^{14}$)O]$_f$—, wherein each of $R^9$, $R^{10}$, $R^{11}$, $R^{12}$, $R^{13}$ and $R^{14}$ is independently selected from a monovalent organic group as defined above for $R^7$ and $R^8$, E is a divalent optionally substituted hydrocarbyl group as defined above for A in the context of the cyclic carbosiloxane monomer such as an alkylene group, and e and f are each an integer in the range from 1 to 20 such as from 1 to 10, for example being 1, 2, 3, 4 or 5.

The oxoacid can e.g. be exemplified by any one of the oxoacids mentioned above as acidic catalyst such as e.g. a perfluoroalkane sulfonic acid. Typically the oxoacid is of a type that the moiety obtained from the oxoacid by formal abstraction of a hydrogen atom represents a good leaving group, i.e. may relatively easy be removed e.g. by hydrolytic cleavage of an ester bond. A preferred example would be triflic acid, in which case the moiety obtained from the oxoacid by formal abstraction of a hydrogen atom is a triflate group.

The monovalent organic groups from which $R^7$ and $R^8$ (and likewise, if applicable L, $R^9$, $R^{10}$, $R^{11}$, $R^{12}$, $R^{13}$ and $R^{14}$) are each independently selected comprise generally from 1 to 30 carbon atoms, such as from 1 to 18 carbon atoms, from 1 to 12 carbon atoms or from 1 to 6 carbon atoms. Suitable monovalent organic groups include e.g. hydrocarbyl groups but likewise organic groups that contain also heteroatoms. The monovalent organic group can further each be of a linear or branched structure or comprise one or more cyclic moieties, be saturated or insaturated and/or be aromatic or non-aromatic. It may for instance be selected from an alkyl group, alkenyl group, alkinyl group, aryl group, aralkyl group, alicyclic group or heterocyclic group, wherein each of these groups may optionally be substituted by one or more functional group(s). Suitable alkyl and alicyclic groups comprise for instance methyl, ethyl, isopropyl, n-propyl, n-butyl, sec-butyl, tert-butyl, amyl, cyclohexyl, heptyl, 2-ethylhexyl, dodecyl, hexadecyl and octadecyl. Suitable alkenyl groups include for example vinyl, allyl and butenyl. Suitable aryl and aralkyl groups can be exemplified by phenyl, tolyl, xylyl, benzyl, naphthyl and the like. Suitable heterocyclic groups can be for example pyridinyl, furanyl, indyl, pyranyl, thienyl and the like. Functional groups, which may optionally be present in the monovalent organic group such as any one of the exemplary monovalent organic group mentioned above, can for instance be selected from the group of halogen such as chlorine, fluorine, bromine or iodine, carboxyl, carbonyl, keto, amino, amido, ether, hydroxy, cyano and mercapto, whereof halogen atoms are preferred.

The divalent organic group, if present in the above-described silanol-functional compound, can for instance be a divalent hydrocarbyl group comprising from 1 to 30 carbon atoms, such as from 1 to 18 carbon atoms or from 1 to 12 carbon atoms. It can comprise linear or branched moieties and/or cyclic or acyclic moieties and/or aliphatic or aromatic moieties, be saturated or unsaturated. The divalent organic group can be a hydrocarbyl group such as e.g. an alkylene group, an alkenylene group, a cycloalkylene group, an alkynylene group, an arylene group, an arylalkylene group or an alkylarylene group. Non-limiting examples hereof include for instance methylene, ethylene, propylene, cyclohexylene, tolylene, xylylene, phenylene, biphenylene, ethynylene and ethenylene. However, the divalent organic group can also include one or more heteroatoms (e.g. N, O, S, P, halogen etc.), e.g. comprise one or more heterocyclic moieties and/or one or more functional group. Non-limiting examples of functional groups include halogen atoms such as chlorine, bromine, fluorine and iodine, oxygen containing groups such as carboxyl, carbonyl, keto, (meth)acryl, hydroxyl, ether and polyether groups, nitrogen containing groups such as amine, imine, amide and cyano groups, and sulphur containing groups such as mercapto and thioether groups. Non-limiting examples of heteroatom-containing divalent organic groups are e.g. oxydiphenylene, furanylene, halogenated phenylene and the like.

Nonlimiting examples of suitable silanol-functional compounds comprise for instance trimethyl silanol, triethylsilanol, (tert.butyl)dimethyl silanol, 3-(hydroxyl-dimethylsilyl)-alanine, 3-(hydroxydimethylsilyl)-N-methyl-alanine, (3-chloropropyl)-dimethylsilanol, (3,3,3-trifluoropropyl)dimethylsilanol, ethenyldimethylsilanol, dimethylpropylsilanol, (chloromethyl)dimethylsilanol, (dichloromethyl)dimethyl-silanol, ethoxydimethylsilanol, (bromomethyl)dimethylsilanol, (3-hydroxypropyl)-dimethylsilanol, (3-aminopropyl)dimethylsilanol, 3-(hydroxydimethylsilyl) propanoic acid, 3-(cyclohexylamino)propyl-dimethylsilanol, (2-hydroxycyclohexyl)dimethyl-silanol, 2-(hydroxy-dimethylsilyl)-2-cyclohexen-1-one, (3-hydroxy-4-hexyn-1-yl)-dimethylsilanol, (5-chloro-1-pentyn-1-yl) dimethylsilanol, 1,4-Bis(hydroxydimethyl-silyl)benzene, Dimethylphenylsilanol, (Oxydi-4,1-phenylene)bis(dimethylsilanol), tert-butyl(dimethyl)silanol, (4-Methoxy-phenyl) dimethylsilanol, phenyldimethyl-silanol, diphenylmethylsilanol, (4-chloro-phenyl)dimethylsilanol, (4-trifluoromethyl-phenyl)dimethylsilanol, (4-methylphenyl)-dimethylsilanol, (4-nitrophenyl)dimethyl-silanol, (4-methoxyphenyl)dimethylsilanol, (4-bromophenyl)dimethylsilanol, (4-hydroxyphenyl)dimethylsilanol, (2-hydroxy-phenyl)dimethylsilanol, (4-amino-phenyl)dimethylsilanol, (3-aminophenyl)-dimethyl-silanol, (2,4,5,6-tetrafluoro-1,3-phenylene)-bis-[dimethyl-silanol], 4-(hydroxydimethyl-silyl)-benzoic acid, 1-(2,5-dimethoxyphenyl)-1,1-dimethylsilanol, 1-(2,3-dimethoxy-phenyl)-1,1-silanol, 1-(2-fluorophenyl)-1,1 dimethyl-silanol, 1,1-dimethyl-1-[4-(methyl-thio)-phenyl]-silanol, 3-(hydroxydimethylsilyl)-benzoic acid, 3-[(hydroxydimethylsilyl)-methyl]-benzoic acid, 1,1'-[[1,1'-biphenyl]-4,4'-diyl]-bis-[1,1-dimethylsilanol], 1,1-dimethyl-1-(1-naphthalenyl)-silanol, (2,6-dimethoxyphenyl)-dimethylsilanol, 1,1-dimethyl-1-(2-naphthalenyl)-silanol, (5,6-Dihydro-4H-pyran-2-yl)dimethylsilanol, Dimethyl-(thien-2-yl)silanol, (N-Boc-2-pyrrolyl)dimethylsilanol, N-Boc-2-indolyl-dimethyl-silanol, 2-(hydroxydimethylsilyl)-1,1-dimethylethylindole-1-carboxylic acid ester, 1-(2-furanyl)dimethylsilanol, (2-benzofuranyl)dimethylsilanol, 1,1,3,3-tetramethyl-1,3-disiloxanediol, 1,1,3,3,5,5,7,7-octamethyl-1,7-tetrasiloxane-diol, 1,1,3,3,5,5,7,7,7-nonamethyl-1-tetrasiloxanol; 1,1,3,3,5,5-hexamethyl-1,5-tri-siloxane-diol, α,ω-oligo(silmethylenesiloxane), 1,1,3,3,5-pentamethyl-5-phenyl-1,5-trisiloxane-diol, 2-(hydroxydimethylsilyl)-2-cyclopenten-1-one, 2-(hydroxyl-dimethylsilyl)-3-methyl-2-cyclopenten-1-one, and derivatives thereof, wherein one or more of the siloxane group(s) is/are esterified e.g. by means of triflic acid, and combinations thereof. Exemplary triflates include e.g. the trimethylsilyltriflate, (tert.-butyl)dimethylsilyltriflate, (1,1,2-trimethylpropyl)dimethylsilyltriflate and dimethylsilylditriflate.

The silanol-functional compounds, which may be used in the process according to the present invention, can in particular have a structure according to the following formula:

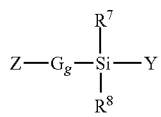

wherein Y, $R^7$ and $R^8$ are as defined above. The parameter g is an integer in the range from 0 to 20 such as from 0 to 10, for example being 0, 1, 2, 3, 4 or 5. Each group G, if any, is independently selected from a siloxy unit —Si($R^9$)($R^{10}$) O— and a carbosiloxy unit —Si($R^{11}$)($R^{12}$)-E-Si($R^{13}$)($R^{14}$) O—, wherein each of $R^9$, $R^{10}$, $R^{11}$, $R^{12}$, $R^{13}$ and $R^{14}$ is independently selected from a monovalent organic group as defined above for $R^7$ and $R^8$ and E is a divalent optionally substituted hydrocarbyl group as defined above for A in the context of the cyclic carbosiloxane monomer such as an alkylene group. The group Z is selected from a group as defined for Y, a monovalent organic group as defined above for $R^1$, $R^2$, $R^3$ and $R^4$, hydrogen and halogen. Preferably Z can be selected from a group as defined for Y, a saturated hydrocarbyl group having from 1 to 12 carbon atoms, preferably an alkyl group such as methyl or ethyl, and an ethylenically unsaturated hydrocarbyl group having from 2 to 8 carbon atoms, preferably an alkenyl group such as vinyl or allyl. If g is 0 the group Z is directly bond to the silicon atom bearing also the group Y. Preferably $R^7$ and $R^8$ are each independently selected from the group of a linear or branched alkyl or fluoroalkyl group having from 1 to 8 carbon atoms such as methyl, ethyl, n-propyl, iso-propyl, n-butyl, tert-butyl, hexyl and 2-ethylhexyl and fluorinated derivatives thereof like trifluormethyl and an aryl or aralkyl group having from 6 to 12 carbon atoms such as phenyl, xylyl, tolyl and benzyl. If the resulting carbosiloxane polymer shall be cross-linkable, it is preferred that the silanol-functional compound comprises at least one ethylenically unsaturated group such as a vinyl group.

In a preferred embodiment of the present invention a silanol-functional compound of the above structure is employed, wherein Y is selected from a hydroxyl group and a triflate group, each of $R^7$, $R^8$, $R^9$, $R^{10}$, $R^{11}$, $R^{12}$, $R^{13}$ and $R^{14}$, is methyl or ethyl, E is an alkylene unit having from 1 to 12 carbon atoms such as methylene or ethylene, g is in the range from 0 to 10 such as 0 or 1 or 2, and Z is selected from a hydroxyl group, a triflate group, methyl, ethyl and a vinyl group.

Preferred specific suitable silanol-functional compounds may thus be exemplified by trimethylsilanol, triethylsilanol, pentamethyldisiloxan-1-ol, pentaethyldisiloxan-1-ol, triethylsilyltriflate, trimethylsilyltriflate, vinyldimethyl-silanol, vinyldimethylsilyltriflate, vinyldiethylsilanol, vinyldiethylsilyltriflate, pentamethyldisiloxyltriflate pentaethyldisiloxyltriflate, and oligomers of bis-silanol terminated poly(dimethylsiloxane) (PDMS) or poly(silmethylene-co-dimethyl-siloxane) or triflate esters thereof, or a combination thereof. Typically the silanol-functional compounds used according to the present invention have a molecular weight or a weight average molecular weight of below 2,000 g/mol, preferably below 1,000 g/mol or below 500 g/mol.

As the skilled artisan perceives the silanol-functional compound(s) used in the process according to the present invention represent a separate component used in addition to the cyclic monomer(s) and are thus generally different from species derived from the employed cyclic monomer(s) which may for instance be generated in variable amounts by ring opening polymerization reaction of the cyclic monomer(s). According to the present invention the silanol-functional compound(s) is/are rather generally deliberately added to the cyclic monomer(s) in a defined amount prior to the ring opening polymerization, which enables to control the ring opening polymerization reaction and the structure of the resulting carbosiloxane polymer as explained herein.

The silanol-functional compounds may impact the growth of the polymer chains in the ring opening polymerization according to the present invention. Herein, the silanol-functional compound can become part of the polymer chains e.g. by the formation of one or more siloxane bond. The degree of polymerization achievable in the final polymer is found to be typically directly proportional to the molar ratio of monomer to silanol-functional compound in the process according to the present invention. Varying the amount of silanol-functional compound used in proportion to the total amount of monomers in the ring opening polymerization of the process according to the present invention thus enables a systematic control of the degree of polymerization and thereby the average molecular weight of the obtained polymer over a wide range. The amount of silanol-functional compound used in the process according to the present invention therefore depends on different aspects such as the livability of the silanol-functional compound(s) in the reacting medium, the achievable degree of monomer conversion under the chosen reaction conditions and the number of free silanol groups and blocked silanol groups present and is generally selected according to the targeted average molecular weight of the final polymer. In case of doubt the amount of silanol-functional compound required in a specific case can be determined by a simple test series varying the proportion of silanol-functional compound relative to the monomer(s) and determining the average molecular weight of the polymer obtained under the specific reaction conditions by suitable analytical methods such as size exclusion chromatography as the skilled artisan is aware of. Typically the amount of silanol-functional compound is selected such that the molar ratio of monomer to silanol-functional compound is in a range from 10,000:1 to 10:1, preferably from 1,000:1 to 20:1 or from 500:1 to 30:1.

Moreover selecting the kind of used silanol-functional compound enables simultaneously a certain control of the end groups of the resulting polymer: The use of a silanol-functional compound having two free or blocked silanol groups (difunctional silanol-functional compound) enables for example the preparation of telechelic bis-silanol terminated polymers. On the other hand a silanol-functional compound with a single free or blocked silanol group (monofunctional silanol-functional compound) may be envisaged to provide linear polymer molecules with a silanol group at one end while the other end is capped by a moiety derived from the silanol-functional compound e.g. by the formation of a siloxane bond. Thus the terminal group can e.g. be of the structure

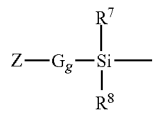

wherein G, g, $R^7$, $R^8$ and Z have the same meaning as defined above under the proviso that Z is not selected from a group as defined for Y. For example use of pentamethyldisiloxan-1-ol as silanol-functional compound introduces a $Me_3Si$—O—$Si(Me)_2$- end group, while vinyldimethylsilanol introduces a vinyldimethylsilyl end group. However, due to side-reactions of termination of chain growth by condensation of two polymer chains or by reaction of a silanol group of one propagating species with a second molecule of the silanol-functional compound, also both end groups may be capped by the silanol-functional compound in the formed linear carbosiloxane polymer molecules.

The proportions of the polymer species with different end groups, i.e. one end capped by a moiety derived from a silanol-functional compound and the other end by a silanol group or both ends capped by a moiety derived from a silanol-functional compound or bis-silanol terminated polymer molecules, depend not only on the type of selected silanol-functional compound(s), but also on the amount of silanol-functional compound(s) used in proportion to the catalyst. Although the amount of silanol-functional compound component is not particularly limited, it is typically selected such that the molar ratio of catalyst to silanol-functional compound(s) is in a range from 1:100 to 100:1 such as 1:20 to 20:1 or 1:10 to 10:1. For example exclusively polymers capped at both ends by a moiety derived from a silanol-functional compound may be formed by using a molar excess of monofunctional silanol-functional compound relative to the catalyst such as a molar ratio of catalyst to silanol-functional compound of less than 2:3, e.g. in the range from 1:10 to less than 2:3. If used in about equimolar molar amounts or if the catalyst is used in molar excess relative to the silanol-functional compound, the molar ratio of catalyst to silanol-functional compound being for example in a range from 1:1 to 10:1, typically a mixture of polymers capped at both ends by a moiety derived from a silanol-functional compound, bis-silanol capped polymers and polymer molecules having one end capped by a moiety derived from a silanol-functional compound and the other end by a silanol group are obtained by the process according to the present invention. Exclusively bis-silanol terminated polymer molecules can be obtained, if no monofunctional, but at least one difunctional silanol-functional compound is used.

The ring opening polymerization is typically carried out in the absence of a solvent or diluent according to the process of the present invention. Thus usually the neat at least one cyclic monomer serves as reaction medium for the ring opening polymerization. Nevertheless, the reaction may also be conducted in solution or suspension prepared by using a suitable organic solvent, which does not participate actively in the reaction. Typically the reaction medium is stirred e.g. by common means for mechanical mixing in an intensity sufficient to substantially homogenize the medium despite of an increasing viscosity.

Typically, the ring opening polymerization according to the process of the present invention is carried out under an inert gas such as in an atmosphere of nitrogen or argon. Nevertheless, water may be unintentionally introduced into the reaction mixture by impurities of the starting compounds and/or the reactor or water may be formed in-situ due to condensation reactions e.g. among silanol groups of the silanol-functional compound(s) and/or the growing polymer chains. It is preferable that water, if present in the ring opening polymerization, is present in an amount such that the molar ratio of water to catalyst is less than 6, preferably 4 or less. At higher water content an inhibition of the polymerization reaction may occur.

The ring opening polymerization may in principle be carried out at any suitable temperature according to the present invention. However, it is a characteristic advantage of the process according to the present invention that the polymerization can be accomplished under comparatively mild conditions within reasonably short reaction time. Thus an equilibrium of linear carbosiloxane polymer, macrocyclic molecules and remaining cyclic monomers can typically be reached within a reaction time of 5 minutes to 4 hours at a reaction temperature in the range from 5 to 80° C. such as from 15 to 40° C. or from 20 to 30° C. The ring opening polymerization in the process according to the present invention is typically carried out at a temperature below 70° C. such as a temperature in a range from 10 to 50° C. or from 20 to 30° C. such as at about 25° C. It can in particular be conducted efficiently at ambient temperature.

The proportion of linear carbosiloxane polymer obtained in equilibrium according to the process of the present invention is typically 30 weight percent or more, such as in the range from 35 to 70 weight percent, based on the total weight of monomers employed as starting material. The remaining portion of the reaction mixture in equilibrium is typically made up of unreacted cyclic monomers and by-products such as macrocycles.

The ring opening polymerization reaction may be terminated if desired, preferably after allowing lapse of sufficient time to reach the equilibrium, by addition of a neutralizing agent, i.e. depending on the nature of the used catalyst a base or an acid, respectively, to deactivate the catalyst. The type of acid or base used as neutralizing agent is not particularly limited. For instance any one of the acids or bases mentioned above in the context of the catalyst can be used as neutralizing agent, provided that it deactivates the used catalyst.

The formed linear carbosiloxane polymer can be separated from the reaction mixture by any suitable methods of separation. For example it can be precipitated in a suitable organic solvent such as methanol and subsequently be removed e.g. by filtration. Depending on the requirements of its intended application, the polymer may be dried under vacuum and/or further purified by other conventional methods known as such prior to its use.

Thus the present invention provides a process that allows producing linear carbosiloxane polymers and in particular polysilmethylenesiloxanes in an economically attractive and efficient manner with the ability to control the average molecular weight and the end groups of the polymer by single step ring opening polymerization under mild reaction conditions.

The obtained carbosiloxane polymers generally have a structure according to the formula:

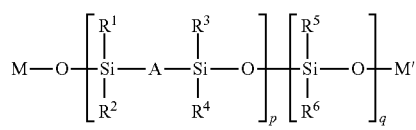

wherein $R^1$, $R^2$, $R^3$, $R^4$, $R^5$, $R^6$ and A are as defined above and can each be the same or different in the constituting carbosiloxy —Si($R^1$)($R^2$)-A-Si($R^3$)($R^4$)—O— repeating units as well as in the siloxy —Si($R^5$)($R^6$)—O— repeating units, if any. The parameter p is an integer which denotes the number of constituting carbosiloxy —Si($R^1$)($R^2$)-A-Si($R^3$)($R^4$)—O— repeating units, and is at least 1, preferably at least 10, more preferably at least 20. The parameter q is an integer which denotes the number of constituting siloxy —Si($R^5$)($R^6$)—O— repeating units, if any, and can be zero or 1 or more than 1. If the cyclic monomers used to prepare the polymer comprise only cyclic carbosiloxane monomers q is 0 and the polymer chain has alternately divalent organic groups and oxygen atoms as bridging groups between Si atoms. If cyclic siloxane monomers are used in addition to cyclic carbosiloxane monomers in the preparation process q can be greater than zero. The resultant copolymers can be random or block copolymers, in other words the carbosiloxy units and siloxy units, if any, can be distributed in any possible order to form the polymer chain. The proportion of carbosiloxy units to siloxy units, if used, can be varied in a wide range with the ratio p/q e.g. in a range from 100:1 to 1:100 or from 20:1 to 1:20. The sum of p and q, also referred to as the degree of polymerization (DP), is typically greater than 50 such as greater than 100 or greater than 200.

A polymeric material in its entirety generally comprises polymer molecules of different degrees of polymerization. The corresponding distribution of molecular masses can be measured e.g. by size exclusion chromatography (SEC) as described in detail in the examples and allows deducing the number average molecular weight ($M_n$) and the polydispersity index (PDI=$M_n$/$M_w$, wherein $M_w$ is the weight average molecular weight) as a measure of the degree of polymerization (DP) and the width of the molecular weight distribution, respectively. If not indicated otherwise, "molecular weight" and "average molecular weight" with respect to polymers refers herein to $M_n$. As pointed out above, the thorough purification of the cyclic carbosiloxane monomer in the process according to the present invention enables obtaining linear carbosiloxane polymers including polysilmethylenesiloxanes of high molecular weight ($M_n$>100,000 g/mol) by a single ring opening polymerization step. The use of the silanol-functional compound(s) enables adjusting the average molecular weight to lower values in a well-controlled manner in a wide range. Thus the resulting carbosiloxane polymers can have a number average molecular weight in the range from 1,000 g/mol to 500,000 g/mol. Typically $M_n$ is in the range from 5,000 g/mol to 200,000 g/mol. The polydispersity index of the obtained linear carbosiloxane polymers is typically in a range from 1 to 5 such as from 1.2 to 2.5 or from 1.5 to 2.

The end groups M and M' of the carbosiloxane polymer molecules can be controlled by the choice of the silanol-functional compound(s) and the reaction conditions as outlined above. Accordingly M and M' in the above formula are each individually selected from moieties corresponding to the afore-mentioned end groups. Thus M and M' can e.g. be individually selected from hydrogen (in case of a silanol end group), a group having a structure of

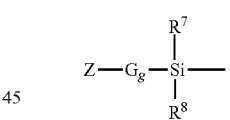

wherein Z, G, d, $R^7$ and $R^8$ are as defined above. The obtained polymer can e.g. be bis-silanol terminated (M and M'=H), in particular if a difunctional silanol compound is used in the preparation process, or have both ends capped by a moiety derived from a monofunctional silanol compound, in particular if such monofunctional silanol compound is used in molar excess to the catalyst. In a particular embodiment it is preferred that at least one of the end groups (M, M') and/or the pendant groups ($R^1$-$R^6$) comprises one or more than one cross-linkable moiety such as a vinyl or allyl group.

The linear carbosiloxane polymers obtained according to the process of the present invention can be used in a variety of fields such as in the construction, automotive, aerospace and process industry e.g. as elastomer, adhesive, sealant, weathering-resistant coating or release agent, in particular where thermal and/or chemical stability are required.

The following non-limiting Examples are intended to illustrate the present invention. The scope of the present invention is however not to be construed in any way to be limited to these Examples, but rather has to be regarded in the light of the entire specification.

EXAMPLES

I. Characterization Techniques

Samples of this experimental section were characterized making use of the following techniques:

a) NMR Spectroscopy

NMR experiments were performed on a Bruker Avance 400 spectrometer at 363 K using a 5 mm BBFO+ probe equipped with a z-gradient coil. The temperature was calibrated with a tube containing 80 wt. % ethylene glycol and 20 wt. % deuterated DMSO using the temperature-dependent chemical shift difference between the OH protons and the methylene groups of the glycol component for calibration. $^1$H-NMR spectra were recorded in deuterated chloroform operating the spectrometer at 400.13 MHz with a single pulse sequence having a 30° pulse angle (64 scans, relaxation delay of 2.3 s). $^{13}$C-NMR spectra were acquired at 100.61 MHz operation frequency in deuterated chloroform using a power gate pulse sequence with a 70° pulse angle (128 scans, relaxation delay of 3 s). $^{29}$Si-NMR spectra were recorded at an operation frequency of 79.5 MHz in a 0.01 M chromium(III) acetylacetonate solution in deuterated chloroform using a single pulse sequence with a 70° pulse angle (512 scans, relaxation delay of 20 s). Fourier transformation and a baseline correction were performed before integration of the peaks with the Bruker software. Prior to Fourier transformation a line broadening of 1 Hz ($^{13}$C-, $^{29}$Si-NMR) or 0.3 Hz ($^1$H-NMR) was applied.

b) Gas Chromatography Coupled with Mass Spectrometry (GC-MS)

Gas chromatography coupled with mass spectrometry (GC/MS) was performed on a Agilent Technologies 6890 N apparatus, equipped with an electrospray mass detector Agilent 5973 N and an apolar capillary column HP5-MS 30 m×0.25 mm (stationary phase made of a film of diphenyldimethylpolysiloxane 5%, 0.25 μm).

c) Electrospray Ionization Mass Spectrometry (ESI-MS)

High resolution mass spectra HRMS were obtained by Electrospray Ionisation (ESI) on a Micromass-Waters Q-TOF Ultima Global.

d) FT-IR Spectroscopy

Infrared spectra were recorded on a Nicolet 6700 FT-IR apparatus. Typically 16 scans were accumulated for each spectrum (resolution, 4 cm$^{-1}$).

e) Size Exclusion Chromatography (SEC)

Size exclusion chromatography (SEC) was carried out on a Malvern Viscotek GPC max equipped with two detectors (a Viscotek VE3580 differential refractometer detector and a 270 dual detector Malvern viscometer) and three Waters columns in series (300 mm length, 7.8 mm diameter, Styragel HR1, HR3 and HR4 (5 μm particle size)) for analysis of molar masses comprised between 100 and 600,000 g·mol$^{-1}$. The temperature of analysis was set at 35° C. both in columns and detectors. Toluene was eluted at a flow rate of 1 mL/min. The samples were prepared by dissolving materials in SEC eluent (3 mg/mL) and by filtering the solution using a 0.2 μm pore size filter. Calibration was performed using polystyrene standards.

II. Preparation of Cyclic Carbosiloxane Monomer a) Synthesis of α,ω-dichlorotetramethylsilmethylene 200 g (1.84 mol) of trimethylchlorosilane (Sigma-Aldrich) were added to 40.4 g (0.25 mol) of bis-(trimethylsilyl)-methane (TCI Europe) and 4.3 g (0.03 mol) of aluminum chloride (Sigma-Aldrich) in a three-necked round bottom flask equipped with a cooler column and the reaction mixture was stirred for 8 h at reflux (58° C.) under argon atmosphere. Volatile tetramethylsilane (bp: 28° C. at 101.3 kPa) that is formed by Cl/methyl exchange reaction was continuously distilled off in order to promote the formation of α,ω-dichlorotetra-methylsilmethylene. Subsequently, the reaction mixture was cooled to room temperature and about 120 mL of acetone were added to deactivate the catalyst. Acetone and the excess of trimethylchlorosilane were then allowed to evaporate at room temperature. The remaining product mixture was subjected to distillation at 63° C. under a reduced pressure of 1 Pa to isolate the α,ω-dichlorotetramethyl-silmethylene. Thus α,ω-dichlorotetramethylsilmethylene was obtained with a yield of about 80%. The mild reaction conditions allowed avoiding the formation of significant amounts of higher chlorinated compounds such as trichloro or tetrachloro analogues to α,ω-dichlorotetramethylsilmethylene as verified by $^{29}$Si NMR.

b) Synthesis of 1,1,3,3,5,5,7,7-Octamethyl-2,6-dioxa-1,3,5,7-tetrasilacyclo-octane 15.9 g (0.20 mol) zinc oxide and 50 mL ethyl acetate were provided in a three necked round bottom flask equipped with a dropping funnel, a magnetic stirrer and a reflux condenser with a nitrogen gas outlet. Over a period of 10 min a solution of 27.0 g (0.13 mol) of the α,ω-dichlorotetramethylsilmethylene obtained by the procedure set forth above under section II a) in 50 mL ethyl acetate was added dropwise at room temperature via the dropping funnel to the stirred reaction medium in the flask. After the addition was completed, the reaction mixture was stirred for further 8 h. The reaction mixture was then slowly poured into a three times greater volume of a saturated aqueous sodium bicarbonate solution under vigorous stirring. The organic phase was separated and dried over anhydrous magnesium sulfate. Ethyl acetate was evaporated from the dried organic phase at room temperature under reduced pressure (2.67 kPa). The thus obtained crude product was then subjected to vacuum distillation at 40° C. and 1.9 Pa. The collected distillate was subjected to a second vacuum distillation at 40° C. and 1.9 Pa for further purification of the cyclic silmethylenesiloxane monomer. Thus about 14.6 g of 1,1,3,3,5,5,7,7-Octamethyl-2,6-dioxa-1,3,5,7-tetrasilacyclo-octane is obtained, which corresponds to a yield of 39%.

Characterization of the distillate obtained by the second vacuum distillation step:

$^1$H-NMR: δ [ppm]=0.10 (s, 12H), −0.14 (s, 2H)
$^{13}$C-NMR: δ [ppm]=8.76, 3.29
$^{29}$Si-NMR: δ [ppm]=5.07

The NMR spectra are in full agreement with data found for 1,1,3,3,5,5,7,7-Octamethyl-2,6-dioxa-1,3,5,7-tetrasilacyclooctane in the literature.

GC-MS: The GC chromatogram displays a dominant peak at 7:15 min and two very small peaks at 8:16 min and 11:47 min retention time. The mass spectrum corresponding to the dominant peak exhibits an intense peak at a m/z value of 277 u, which matches a fragmented molecular ion (M-Me) of 1,1,3,3,5,5,7,7-Octamethyl-2,6-dioxa-1,3,5,7-tetrasilacyclooctane. The mass spectra of the GC peaks at 8:16 min and 11:47 min display signals at a m/z values above 400 u, which can be assigned to higher molecular species as impurities. From the relative integrated areas of the peaks in the GC chromatogram the degree of purity of the obtained 1,1,3,3, 5,5,7,7-Octamethyl-2,6-dioxa-1,3,5,7-tetrasilacyclooctane monomer was calculated to be 99.9 wt. %.

FT-IR spectroscopy: v=1045 cm$^{-1}$ (Si—O—Si), 1250 cm$^{-1}$ (Si—CH$_3$), v=2950 cm$^{-1}$; no detectable bands in the range from 3000 cm$^{-1}$ to 4000 cm$^{-1}$ (i.e. no evidence of Si—OH groups)

c) Monomer Prepared According to U.S. Pat. No. 8,586,690 (for Comparative Examples)

For comparative reasons 1,1,3,3,5,5,7,7-Octamethyl-2,6-dioxa-1,3,5,7-tetrasilacyclooctane prepared as the starting material used as monomer in the first ring opening polymerization step in Example 1 of U.S. Pat. No. 8,586,690 was investigated. This preparation process involved merely a single distillation step at 60° C. under a reduced pressure of 100 Pa.

The NMR spectra of this material are complex and display a number of smaller peaks in addition to the peaks characteristic of 1,1,3,3,5,5,7,7-Octamethyl-2,6-dioxa-1,3,5,7-tetrasilacyclooctane.

Likewise the GC chromatogram displayed numerous peaks in addition to the dominant peak of the cyclic dimer at about 7:15 min. From the relative integrated areas of the peaks in the GC chromatogram the degree of purity of the obtained 1,1,3,3,5,5,7,7-Octamethyl-2,6-dioxa-1,3,5,7-tetrasilacyclooctane monomer was estimated to be about 98 wt. %.

This indicates that the cyclic silmethylenesiloxane monomer prepared as starting material before any ring opening polymerization according to the procedure of U.S. Pat. No. 8,586,690 comprises still significant amounts of impurities (the respective monomer is accordingly referred to hereinafter also as "impure monomer"). This impure monomer was used in comparative ring opening polymerization experiments (see below) to investigate the influence of purity of the starting material used as monomer component.

III. Preparation of Silanol-Functional Compounds for Use in the ROP

A monofunctional silanol compound and a difunctional silanol compound were prepared by hydrolytic dehydrogenation from a silane precursor:

a) Preparation of pentamethyldisiloxan-1-ol as Monofunctional Silanol Compound 3.6 g of distilled water, 10 g of acetone and 0.15 g of a catalyst (5 wt. % Pt on activated carbon powder) were introduced into a three-necked flask equipped with a cooler column under an argon blanket. Subsequently, 11.1 g of pentamethyldisiloxane (Sigma Aldrich) were added dropwise over a period of 1 h to the stirred reaction mixture. The mixture was continuously stirred until the reaction was completed, i.e. no Si—H moieties were detectable by FT-IR spectroscopy anymore. The catalyst was then removed by filtering and the solvents were allowed to evaporate at room temperature. After purification by vacuum distillation performed at a temperature of 50° C. and a reduced pressure of 2.67 kPa 8.5 g of pentamethyldisiloxan-1-ol (69% yield) were obtained as verified by NMR spectra ($^1$H: δ [ppm] =0.10, 2.5; $^{13}$C: δ [ppm]=0.46, 1.76; $^{29}$Si: δ [ppm]=−10.19, 8.33), which are in agreement with literature data for pentamethyldisiloxan-1-ol.

b) Preparation of Difunctional Silanol Compound

Tetramethylsilmethylene HMe$_2$Si—CH$_2$—SiMe$_2$H as silane precursor was prepared by adding dropwise 1 equivalent of α,ω-dichlorotetramethylsilmethylene to 1.14 equivalents of lithium aluminum hydride dissolved in anhydrous ethyl ether provided in a two necked flask equipped with a condenser under a continuous argon stream. The reaction was allowed to continue until complete as indicated by the total disappearance of the Si—Cl peak at 28.5 ppm in the $^{29}$Si NMR spectrum. Excess LiAlH$_4$ was then deactivated by treating the reaction mixture with 0.1 M HCl solution at 0° C. The resulting mixture was extracted three times with ethyl ether. The combined ether extracts were dried over anhydrous magnesium sulfate. By evaporation of solvent at room temperature and a subsequent distillation (101° C., atmospheric pressure) tetramethylsilmethylene HMe$_2$Si—CH$_2$—SiMe$_2$H was obtained with a yield of 77%.

The preparation of the difunctional silanol-functional compound was performed as described above for the monofunctional silanol-functional compound except that 9.9 g of the tetramethylsilmethylene prepared as set forth above were used instead of pentamethyldisiloxane as silane precursor. The ESI spectrogram of the obtained purified product exhibited a series of molecular ion peaks indicative of the formation of a mixture of linear oligomers HO—[SiMe$_2$-CH$_2$—SiMe$_2$-O]$_x$—H with x=1-6.

IV. Ring Opening Polymerization (ROP)

a) Comparative Example 1: ROP in the Presence of Triflic Acid

Ring opening polymerization of a) the impure monomer or b) the thoroughly purified 1,1,3,3,5,5,7,7-Octamethyl-2,6-dioxa-1,3,5,7-tetrasilacyclooctane monomer as described above under section II c) or b), respectively, in the presence of different concentration levels of triflic acid (TfOH) was investigated in order to determine the effect of monomer purity and to elucidate the role of the acid in the polymerization process. The tested recipes as well as the results in terms of the reaction time required to reach the thermodynamic equilibrium and the number average molecular weight ($M_n$) and polydispersity index (PDI=($M_w/M_n$)) of the final polymer as determined by SEC are summarized in Table 1.

Each polymerization was conducted as follows: An amount of the respective monomer as indicated in Table 1 was introduced into a 25 mL Schlenk flask maintained at a temperature of 25° C. by an oil bath and held under an argon blanket. Triflic acid was then added through a septum with a micro syringe to the monomer in the flask in the corresponding amount indicated in Table 1 to start the polymerization reaction. The reaction mixture was continued to be stirred for 24 h. Aliquots of about 1 mL were taken at regular intervals during this period for analysis by SEC to follow the progress of the polymerization reaction. Triethylamine (1 μL) was each added directly after taking the aliquot and prior to analysis for quenching the reaction and preventing any depolymerization. The monomer conversion was calculated from the ratio of the integrated area of the peak of the polymer to the integrated area of the peak of the monomer in the SEC chromatogram. After lapse of the 24 h reaction time triflic acid was neutralized by adding an equimolar amount of triethylamine to the reaction mixture. The resulting mixture was then dissolved in dichloromethane. The formed polymer was precipitated from this solution in cold methanol and dried under vacuum. NMR spectra of the precipitated products were in accordance with literature data for linear bis-silanol terminated polysilmethylenesiloxanes:

$^1$H-NMR: δ [ppm]=0.09, −0.07
$^{13}$C-NMR: δ [ppm]=9.78, 3.16
$^{29}$Si-NMR: δ [ppm]=17.7, 5.23.

TABLE 1

| Example | Monomer | m(monomer) [g] | V(TfOH) [μL] | $t_{equilibrium}$ | $M_n$ [g/mol] | PDI |
|---|---|---|---|---|---|---|
| 1 A | Impure[1] | 2.00 | 1 | 4 h | 18,000 | 1.6 |
| 1 B | Impure[1] | 1.98 | 5 | 3 h | 23,000 | 1.7 |
| 1 C | Impure[1] | 2.00 | 10 | <30 min | 38,000 | 1.5 |
| 1 D | impure[1] | 2.00 | 15 | <30 min | 31,000 | n/a |
| 1 E | Impure[1] | 1.99 | 20 | <30 min | 34,000 | n/a |
| 1 F | Purified[2] | 2.00 | 10 | <30 min | 170,000 | 1.8 |
| 1 G | Purified[2] | 2.00 | 10 | <30 min | 170,000 | 1.8 |

[1] monomer as described in section II c)
[2] monomer as described in section II b)
n/a: not available It was found that a thermodynamic equilibrium was attained at about 60% monomer conversion irrespective of the tested reaction conditions. As Examples 1 A to 1 E illustrate, the polymerization reaction proceeds faster, i.e. the equilibrium is reached in a shorter time, when increasing the concentration of triflic acid. On the other hand the average molecular masses of the polymers obtained in these experiments apparently do not exhibit a systematic dependency on the concentration of triflic acid. This shows that triflic acid merely functions as a catalyst in the ring opening polymerization and does not modify the resulting polymer at the same time.

While the polydispersity index is consistently in a range from 1.5 to 1.8 for all Examples of Table 1 indicative of a relatively narrow molecular weight distribution, only polymers with comparatively low number average molecular weight are obtained in Examples 1A to 1 E, wherein the impure monomer has been used as starting material. $M_n$ varies herein from about 15,000 g/mol to about 40,000 g/mol and is thus in a range as observed also by Interrante et. al, Macromolecules, 34 (2001), 1545-1547 and in U.S. Pat. No. 8,586,690 (first polymerization step). Examples 1F and 1G demonstrate that on the contrary polysilmethylenesiloxane polymers of substantially higher average molecular weight well above 100,000 g/mol can be obtained with good reproducibility in a single ring opening polymerization step when employing highly purified cyclic silmethylenesiloxane monomer as starting material. This finding illustrates that the observed limitation of the obtainable molecular weight to comparatively low values originates from insufficient purity of the starting materials used as monomer in the ring opening polymerization process. Use of highly purified cyclic monomer enables obtaining linear polysilmethylenesiloxane polymers with substantially higher average molecular weight in a reproducible manner; however, no systematic engineering of the average molecular weight of the obtained polymer and its end groups is attainable when the ring opening polymerization is conducted in the presence of a catalyst such as triflic acid only.

b) Comparative Example 2: ROP in the Presence of Triflic Acid and Water 2.00±0.02 g of the impure monomer as described under section II c) were subjected to ring opening polymerization following the procedure set forth above adding besides 5.0 μL triflic acid water in an amount such that the molar ratio of water:triflic acid was a) 1.0, b) 2.0, c) 4.0 or d) 8.0, respectively. It was observed that neither the kinetics of the polymerization reaction, nor $M_n$ and the PDI of the resulting polymers changed significantly when the molar ratio of water:triflic acid was varied up to a value of 4.0. However, no polymerization occurred at all when the molar ratio of water:triflic acid was increased to a value of 8.0. Thus water inhibits the ring opening polymerization when present in the reaction mixture in excessive amounts presumably due to the formation of inactive polyhydrate species of the acid catalyst.

c) Example 3: ROP in the Presence of Triflic Acid and pentamethyldisiloxan-1-o

The purified 1,1,3,3,5,5,7,7-Octamethyl-2,6-dioxa-1,3,5,7-tetrasilacyclo-octane monomer as described above under section II b) was subjected to ring opening polymerization in the presence of triflic acid and pentamethyl-disiloxan-1-ol ($MD^{OH}$) obtained as described under section III a) following the procedure described above for Comparative Example 1 using the amounts as indicated in Table 2. Herein, the pentamethyldisiloxan-1-ol was each added to the cyclic monomer and mixed therewith in the Schlenk flask prior to the addition of triflic acid.

The thermodynamic equilibrium at about 60% monomer conversion was each reached within the first 3 h of the reaction except for the case of Example 3 E, wherein after 24 h merely about 50% monomer conversion was reached.

TABLE 2

| Example | m(monomer) [g] | V(TfOH) [μL] | m($MD^{OH}$) [mg] | Molar ratio TfOH/$MD^{OH}$ | $M_n$ [g/mol] | PDI |
|---|---|---|---|---|---|---|
| 3 A | 1.99 | 5.0 | 3.7 | 2.5 | 115,000 | n/a |
| 3 B | 2.00 | 5.0 | 5.3 | 1.8 | 80,000 | n/a |
| 3 C | 1.94 | 5.0 | 9.3 | 1.0 | 48,000 | 1.9 |
| 3 D | 2.12 | 5.0 | 18.1 | 0.5 | 32,000 | n/a |
| 3 E | 2.10 | 5.0 | 36.2 | 0.3 | 5,000 | 1.8 | n/a: not available

Table 2 also displays the number average molecular weight and the polydispersity index of the obtained polymers as determined by SEC, where available. $M_n$ systematically decreases as the amount of pentamethyl-disiloxan- 1-ol is increased from about 115,000 g/mol at 3.7 mg MD$^{OH}$ (Example 3 A) to about 5,000 g/mol at 36.2 mg MD$^{OH}$ (Example 3 E). This indicates the capability of pentamethyldisiloxan-1-ol to modify the polymer formation in the ring opening polymerization of the cyclic silmethylenesiloxane monomer in the presence of a catalyst. The polydispersity index does not change significantly compared to ring opening polymerization in the presence of triflic acid only.

Characterization of the polymers obtained according to Examples 3 A to 3 E:

$^{29}$Si-NMR: δ [ppm]=17 (weak, -Me$_2$SiOH, only observed for Examples 3 A-3 C),
7.0 (weak, M unit), 5.23 (strong, —CH$_2$SiMe$_2$O—), 5.07 (weak, residual monomer), -22 (weak, D unit).

$^{13}$C-NMR: δ [ppm]=1.4 (weak, D unit), 1.9 (weak, M unit), 3.1 (strong, —CH$_3$ in polymer), 3.2 (weak, —CH$_3$ in residual monomer), 8.7 (weak, —CH$_2$— in residual monomer), 9.7 (strong, —CH$_2$— in polymer).

The NMR spectra indicate the formation of linear polysilmethylenesiloxanes and the presence of minor amounts of residual monomer. If an equimolar ratio of catalyst to pentamethyldisiloxan-1-ol or a molar excess of triflic acid is used terminal silanol groups are detectable by their characteristic signal at 16-18 ppm in the $^{29}$Si NMR spectrum besides Me$_3$Si—O—SiMe$_2$- end groups, which are indicated by the characteristic peaks of the M and D units. On the contrary no peak in the range of 16-18 ppm is detected in the $^{29}$Si NMR for the polymers obtained by ring opening polymerization using a molar excess of pentamethyldisiloxan-1-ol relative to triflic acid. Moreover, it is observed that the intensity of the peaks that are characteristic to the M and D units in the $^{29}$Si NMR and the $^{13}$C NMR spectra decreases as the molar ratio of triflic acid to pentamethyldisiloxan-1-ol increases. These findings indicate that exclusively Me$_3$Si—O—SiMe$_2$-terminated polymers are formed when pentamethyldisiloxan-1-ol is used in sufficient molar excess to triflic acid as in Examples 3 D and 3 E, whereas a mixture of Me$_3$Si—O—SiMe$_2$-terminated polymer molecules and polymer molecules wherein one or both ends are terminated by a silanol group instead of a Me$_3$Si—O—SiMe$_2$-group is obtained when pentamethyldisiloxan-1-ol and triflic acid are used in about equimolar amounts or the acid catalyst is used in molar excess. In the latter case the relative proportion of silanol end groups to terminal Me$_3$Si—O—SiMe$_2$-groups increases with the ratio of acid catalyst to pentamethyl-disiloxan-1-ol.

d) Example 4: ROP in the Presence of Triflic Acid and Triethylsilyltriflate

The purified 1,1,3,3,5,5,7,7-Octamethyl-2,6-dioxa-1,3,5,7-tetrasilacyclo-octane monomer as described above under section II b) was subjected to ring opening polymerization in the presence of commercially available triethylsilyltriflate (Sigma Aldrich) containing 12.4 mol. % of triflic acid, i.e. the molar ratio of acid catalyst to triethylsilyltriflate is 0.14 in Examples 4 A to 4 E) following the procedure described above for Comparative Example 1 except that triethylsilyltriflate was added to the cyclic monomer in the Schlenk flask through a septum with a micro syringe instead of triflic acid. In case of Example 4 E N,N,N,N-tetramethyl-1,8-naphthalenediamine (Sigma Aldrich) was added as 'proton sponge' to the cyclic monomer in molar excess to triflic acid (added amount of the diamine: 0.53 mmol) prior to addition of the triethylsilyltriflate. Table 3 summarizes the amounts of monomer and triethylsilyltriflate (TES triflate) used herein as well as M$_n$ and the PDI measured by SEC for the obtained polymers.

TABLE 3

| Example | m (monomer) [g] | V (TES triflate) [µL] | proton sponge | M$_n$ [g/mol] | PDI |
|---|---|---|---|---|---|
| 4 A | 2.05 | 10 | none | 75,000 | 1.8 |
| 4 B | 2.01 | 20 | none | 25,000 | 2.0 |
| 4 C | 1.99 | 40 | none | 10,000 | 2.0 |
| 4 D | 2.05 | 80 | none | 7,000 | 1.9 |
| 4 E | 2.07 | 80 | added | n/a | n/a | n/a: not available

In case of Examples 4 A to 4 D the monomer conversion was found to level off at about 40%, reaching this thermodynamic equilibrium within less than 30 min. The number average molecular weight of the finally obtained polymers was found to decrease systematically with increasing amount of triethylsilyltriflate from about 75,000 g/mol for the lowest tested amount of TES triflate (Example 4 A) to 7,000 g/mol for the highest tested amount of TES triflate (Example 4 D), while the PDI remained practically constant. In case of Example 4 E, no polymerization was observed even after 20 h indicating that TES triflate alone cannot trigger the ring opening polymerization, but this rather requires the co-presence of a suitable catalyst. Accordingly, it was observed that the polymerization reaction started when additionally 56 µL (0.64 mmol) of triflic acid were introduced to the reaction mixture of Example 4 E after 20 h.

Characterization of the polymers obtained according to Examples 4 A to 4 D:

$^{29}$Si-NMR: δ [ppm]=9.6 (weak, Et$_3$Si—), 5.23 (strong, —CH$_2$SiMe$_2$O—), 5.07 (weak, residual monomer). No peak characteristic of silanol end groups at 16-18 ppm was observed.

$^{13}$C-NMR: δ [ppm]=3.1 (strong, —CH$_3$ in polymer), 3.5 (weak, —CH$_3$ in residual monomer), 6.4 (weak, —CH$_3$ in Et$_3$Si—), 6.8 (weak, —CH$_2$— in Et$_3$Si—), 8.2 (weak, —CH$_2$— in residual monomer), 9.6 (strong, —CH$_2$— in polymer).

The NMR spectra evidence the formation of linear exclusively triethylsilyl-terminated polysilmethylenesiloxanes and the presence of minor amounts of residual monomer.

e) Example 5: ROP in the Presence of Triflic Acid and Oligosilmethylenesiloxanes The purified 1,1,3,3,5,5,7,7-Octamethyl-2,6-dioxa-1,3,5,7-tetrasilacyclo-octane monomer as described above under section II b) was subjected to ring opening polymerization following the procedure described above for Example 3 except that the mixture of oligomers HO—[SiMe$_2$-CH$_2$—SiMe$_2$-O]$_x$—H obtained as described under section III b) was used instead of pentamethyldisiloxan-1-ol and the reaction was terminated after 4 h instead of 24 h. Table 4 summarizes the amounts of monomer and oligomers used herein as well as M$_n$ values determined by SEC for the obtained polymers.

TABLE 4

| Example | m (monomer) [g] | V (TfOH) [µL] | m (oligomers) [mg] | M$_n$ [g/mol] |
|---|---|---|---|---|
| 5 A | 1.99 | 10 | 19.1 | 120,000 |
| 5 B | 2.00 | 10 | 61.2 | 40,000 |
| 5 C | 2.00 | 10 | 93.6 | 25,000 |
| 5 D | 2.05 | 10 | 190.0 | 12,000 |
| 5 E | 2.07 | 10 | 323.6 | 7,000 |

Under these conditions the thermodynamic equilibrium was at about 40% monomer conversion and was each reached within the first hour of the reaction. As evident from Table 4, $M_n$ of the final polymer systematically decreases by more than one order of magnitude when the amount of oligosilmethylenesiloxanes present in the reaction mixture was increased from 19.1 mg (Example 5 A) to 323.6 mg (Example 5 E) indicating that said oligomers are able to modify the polymer formation in the ring opening polymerization of the cyclic silmethylenesiloxane monomer in the presence of an acid catalyst.

Characterization of the polymers obtained according to Examples 5 A to 5 E:

$^{29}$Si-NMR: δ [ppm]=17.7 (weak, -Me$_2$SiOH), 5.2 (strong, —CH$_2$SiMe$_2$O—).

$^{13}$C-NMR: δ [ppm]=3.1 (—CH$_3$), 9.7 (—CH$_2$—); integrated peak area (—CH$_3$):(—CH$_2$—) of 1:4.

The NMR spectra indicate the formation of telechelic bis-silanol terminated linear polysilmethylenesiloxanes.

The foregoing examples 3 to 5 demonstrate that compounds having one or two groups selected from free or blocked silanol groups act as modifier in the catalyzed ring opening polymerization of cyclic carbosiloxane monomers affecting the attained average molecular weight as well as the end groups of the resulting polymers. Adding such silanol-functional compound in well-defined amounts enables to systematically control the final average molecular weight of the obtained polymer such as polysilmethylenesiloxanes over a wide range ($M_n$ well above 100,000 g/mol to less than 10,000 g/mol) in a highly reproducible manner, if the starting material used as cyclic monomer has been thoroughly purified. Furthermore the selection of the silanol-functional compound and adjustment of its proportion relative to the catalyst enables a versatile control of the end groups of the resulting linear polymer molecules. The polymerization process can be carried out in a single step under mild reaction conditions such as at ambient temperature with good yields of the desired linear polymer within short reaction times.

The invention claimed is:

1. Process for preparing a linear carbosiloxane polymer, which comprises subjecting at least one cyclic carbosiloxane monomer of the structure

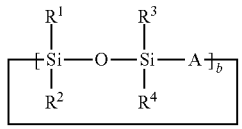

wherein b is an integer in the range from 2 to 6, each A is independently selected from a divalent optionally substituted hydrocarbyl group having from 1 to 20 carbon atoms, and each $R^1$, $R^2$, $R^3$ and $R^4$ is independently selected from a monovalent organic group having from 1 to 18 carbon atoms, to ring opening polymerization in the presence of an acidic or basic catalyst and at least one compound having one or two group(s) selected from free silanol groups and blocked silanol groups, wherein the at least one cyclic carbosiloxane monomer is purified to a degree of purity of at least 99.0 weight percent prior to any ring opening polymerization.

2. The process according to claim 1, wherein the at least one cyclic carbosiloxane monomer is purified to a degree of purity of at least 99.5 weight percent prior to any ring opening polymerization.

3. The process according to claim 2, wherein the at least one cyclic carbosiloxane monomer is purified to a degree of purity of at least 99.8 weight percent prior to any ring opening polymerization.

4. The process according to claim 1, wherein the structure of the cyclic carbosiloxane monomer is characterized by A being an alkylene group and/or b being 2, 3 or 4.

5. The process according to claim 4, wherein A is a linear alkylene group having from 1 to 5 carbon atoms and/or b is 2.

6. The process according to claim 1, wherein each monovalent organic group of the cyclic carbosiloxane monomer is selected from an alkyl group, alkenyl group, alkinyl group, aryl group, aralkyl group, alicyclic group or heterocyclic group, wherein each of these groups may optionally be substituted by one or more than one functional group selected from the group of halogen, carboxyl, carbonyl, keto, amino, amido, ether, hydroxy, cyano and mercapto.

7. The process according to claim 3, wherein each monovalent organic group is selected from an alkyl or fluoroalkyl group.

8. The process according to claim 1, wherein the cyclic carbosiloxane monomer is 1,1,3,3,5,5,7,7-octamethyl-2,6-dioxa-1,3,5,7-tetrasilacyclooctane.

9. The process according to claim 1, wherein the compound having one or two group(s) selected from free silanol groups and blocked silanol groups is a compound of the structure

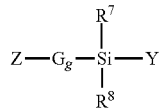

wherein Y is a hydroxyl group or a moiety obtained from an oxoacid by formal abstraction of a hydrogen atom, each of $R^7$ and $R^8$ is independently selected from a monovalent organic group having from 1 to 18 carbon atoms, Z is selected from halogen, hydrogen, a group as defined for Y and a group as defined for $R^7$ and $R^8$, g is an integer in the range from 0 to 20, and each G, if any, is independently selected from a siloxy unit —Si($R^9$)($R^{10}$)O— and a carbosiloxy unit —Si($R^{11}$)($R^{12}$)-E-Si($R^{13}$)($R^{14}$)O—, wherein E is a divalent optionally substituted hydrocarbyl group having from 1 to 20 carbon atoms and each of $R^9$, $R^{10}$, $R^{11}$, $R^{12}$, $R^{13}$ and $R^{14}$ is independently selected from a monovalent organic group as defined above for $R^7$ and $R^8$.

10. The process according to claim 9, wherein Z is selected from a hydroxyl group, a moiety obtained from an oxoacid by formal abstraction of a hydrogen atom, a saturated hydrocarbyl group having from 1 to 12 carbon atoms, and an ethylenically unsaturated hydrocarbyl group having from 2 to 8 carbon atoms.

11. The process according to claim 10, the saturated hydrocarbyl group is an alkyl group selected from methyl or ethyl and the ethylenically unsaturated hydrocarbyl group is an alkenyl group selected from vinyl and allyl.

12. The process according to claim 9, wherein Y is selected from a hydroxyl group and a triflate group, each of $R^7$, $R^8$, $R^9$, $R^{10}$, $R^{11}$, $R^{12}$, $R^{13}$ and $R^{14}$ is methyl or ethyl, E is an alkylene unit having from 1 to 12 carbon atoms, g is in the range from 0 to 10 , and Z is selected from a hydroxyl group, a triflate group, methyl, ethyl and vinyl.

13. The process according to claim 12, wherein E is an alkylene unit selected from methylene or ethylene, and g is 0 or 1 or 2.

14. The process according to claim 1, wherein the compound having one or two group(s) selected from free silanol groups and blocked silanol groups is selected from the group consisting of trimethylsilanol, triethylsilanol, pentamethyl-disiloxan-1-ol, pentaethyl-disiloxan-1-ol, triethylsilyl-triflate, trimethylsilyltriflate, vinyldimethylsilanol, vinyldimethylsilyltriflate, vinyldiethylsilanol, vinyldiethylsilyltriflate, penta-methyldisiloxyltriflate penta-ethyldisiloxyltriflate, and oligomers of bis-silanol terminated poly(dimethylsiloxane) (PDMS), poly(silmethylene-co-dimethyl-siloxane) or triflate esters thereof, or a combination of any of the afore-mentioned compounds.

15. The process according to claim 1, wherein the catalyst is a protonic acid.

16. The process according to claim 1, wherein the molar ratio of the catalyst to the compound having one or two group(s) selected from free silanol groups and blocked silanol groups is in a range from 1:100 to 100:1.

17. The process according to claim 16, wherein the molar ratio of the catalyst to the compound having one or two group(s) selected from free silanol groups and blocked silanol groups is in a range from 1:10 to less than 2:3.

18. The process according to claim 1, wherein the ring opening polymerization is carried out in the absence of a solvent and/or in an inert atmosphere.

19. The process according to claim 1, wherein at least one cyclic siloxane monomer is copolymerized with the at least one cyclic carbosiloxane monomer.

20. The process according to claim 1, wherein the ring opening polymerization is carried out at a temperature in a range from 5 to 80° C.

* * * * *